US012688631B2

(12) United States Patent
Zeng

(10) Patent No.: US 12,688,631 B2
(45) Date of Patent: Jul. 21, 2026

(54) IMAGE PROCESSING METHOD AND APPARATUS, DEVICE, MEDIUM AND PROGRAM PRODUCT

(71) Applicant: Beijing Zitiao Network Technology Co., Ltd., Beijing (CN)

(72) Inventor: Guang Zeng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 198 days.

(21) Appl. No.: 18/567,138

(22) PCT Filed: Aug. 3, 2022

(86) PCT No.: PCT/CN2022/110097
§ 371 (c)(1),
(2) Date: Dec. 5, 2023

(87) PCT Pub. No.: WO2023/020283
PCT Pub. Date: Feb. 23, 2023

(65) Prior Publication Data
US 2024/0221257 A1     Jul. 4, 2024

(30) Foreign Application Priority Data
Aug. 16, 2021     (CN) .......................... 202110935096.0

(51) Int. Cl.
G06T 11/60          (2026.01)
G06T 11/10          (2026.01)

(52) U.S. Cl.
CPC .............. G06T 11/60 (2013.01); G06T 11/10 (2026.01); *G06T 2210/44* (2013.01)

(58) Field of Classification Search
CPC .... G06T 11/60; G06T 11/001; G06T 2210/04
See application file for complete search history.

(56) References Cited

U.S. PATENT DOCUMENTS 11,024,060 B1 *   6/2021   Ma .......................... G06V 20/20
2006/0017739 A1 *   1/2006   Fang ..................... G06T 11/001
345/582

(Continued)

FOREIGN PATENT DOCUMENTS

CN          109859097 A       6/2019
CN          111652791 A       9/2020

(Continued)

OTHER PUBLICATIONS

Fang, Hui, and John C. Hart. "Textureshop: texture synthesis as a photograph editing tool." ACM Transactions on Graphics (TOG) 23.3 (2004): 354-359. (Year: 2004).*

(Continued)

*Primary Examiner* — Yu Chen
(74) *Attorney, Agent, or Firm* — Alleman Hall LLP

(57) ABSTRACT

The present disclosure provides an image processing method and apparatus, device, medium and program product. In the image processing method provided by the present disclosure, a deformation instruction sequence to be applied on a target object in a to-be-processed image is obtained, and then deformation offsets are sequentially superimposed on the to-be-processed image texture based on deformation instructions in the deformation instruction sequence to determine a superimposed deformation image texture. Finally, the target object in the to-be-processed image is deformed based on the superimposed deformation image texture to generate a processed image. Since the superimposition of deformation effect offset is performed on a lower-resolution picture, the overhead is smaller; when multiple effects are superimposed on the mobile side, smooth operation can still be guaranteed. In addition, since only a single interpolation operation is performed, these is less loss of the picture quality.

17 Claims, 7 Drawing Sheets

(56)          References Cited

U.S. PATENT DOCUMENTS

| 2006/0244757 | A1* | 11/2006 | Fang ....................... G06T 15/04 |
| | | | 345/582 |
| 2008/0001963 | A1* | 1/2008 | Lefebvre .............. G06T 11/001 |
| | | | 345/582 |
| 2020/0051303 | A1* | 2/2020 | Li .......................... G06N 3/045 |
| 2020/0334881 | A1* | 10/2020 | Yamada ................... G06T 3/60 |
| 2021/0065420 | A1* | 3/2021 | Orvalho ................. G06T 15/04 |
| 2021/0350621 | A1* | 11/2021 | Bailey .................... G06T 19/20 |
| 2023/0021161 | A1* | 1/2023 | Chen ................... G06V 40/168 |
| 2023/0079478 | A1* | 3/2023 | Hodges .................. G06T 19/20 |
| | | | 345/419 |

FOREIGN PATENT DOCUMENTS

| CN | 112241933 A | 1/2021 |
| CN | 112562026 A | 3/2021 |

OTHER PUBLICATIONS

ISA China National Intellectual Property Administration, International Search Report and Written Opinion Issued in Application No. PCT/CN2022/110097, Oct. 25, 2022, WIPO, 10 pages.

* cited by examiner

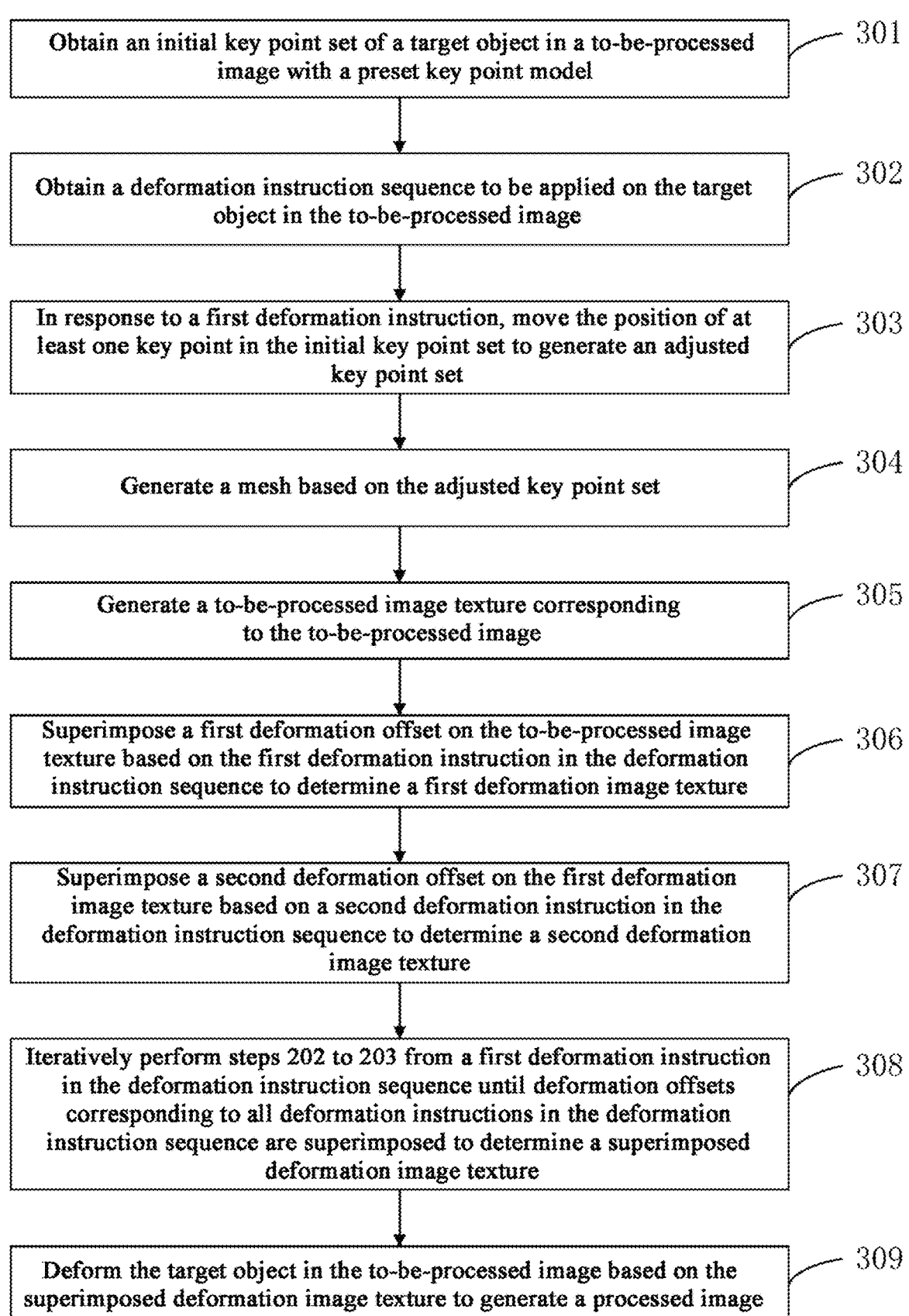

Obtain an initial key point set of a target object in a to-be-processed image with a preset key point model — 301

Obtain a deformation instruction sequence to be applied on the target object in the to-be-processed image — 302

In response to a first deformation instruction, move the position of at least one key point in the initial key point set to generate an adjusted key point set — 303

Generate a mesh based on the adjusted key point set — 304

Generate a to-be-processed image texture corresponding to the to-be-processed image — 305

Superimpose a first deformation offset on the to-be-processed image texture based on the first deformation instruction in the deformation instruction sequence to determine a first deformation image texture — 306

Superimpose a second deformation offset on the first deformation image texture based on a second deformation instruction in the deformation instruction sequence to determine a second deformation image texture — 307

Iteratively perform steps 202 to 203 from a first deformation instruction in the deformation instruction sequence until deformation offsets corresponding to all deformation instructions in the deformation instruction sequence are superimposed to determine a superimposed deformation image texture — 308

Deform the target object in the to-be-processed image based on the superimposed deformation image texture to generate a processed image — 309

Image processing apparatus

404

Key point determining module

401

Deformation instruction obtaining module

402

Deformation offset superimposing module

403

Target object deforming module

501 — Processing unit

502 — ROM

503 — RAM

504

505 — I/O interface

Input unit — 506

Output unit — 507

Storage unit — 508

Communication unit — 509

IMAGE PROCESSING METHOD AND APPARATUS, DEVICE, MEDIUM AND PROGRAM PRODUCT

CROSS-REFERENCE TO RELATED APPLICATION(S)

This application is a national stage application filed under 35 U.S.C. 371 based on International Patent Application No. PCT/CN2022/110097, filed Aug. 3, 2022, which claims priority to Chinese Application No. 202110935096.0 filed with the Chinese Patent office on Aug. 16, 2021 and entitled "IMAGE PROCESSING METHOD AND APPARATUS, DEVICE, MEDIUM AND PROGRAM PRODUCT" the disclosures of which are incorporated herein by reference in their entities.

FIELD

The present disclosure relates to the technical field of image processing, and in particular, to an image processing method and apparatus, device, medium and program product.

BACKGROUND

With the development of intelligent terminal technology, the functionality of intelligent terminals to collect images gets increasingly powerful. Thus, there are more and more applications to perform corresponding processing on images collected by intelligent terminals.

Image deformation is a common method in image processing, for example, face slimming, figure slimming, eye resizing and other deformation processing on a character in an image. However, in the prior art, when deformation processing is performed on an image multiple times, first a deformation is processed on the original image, an output result of which is used as an input of a next deformation; the superimposition on the original image repeats until the final deformation effect is obtained.

Apparently, this approach requires multiple updates to the original image, which will blur the superimposed image.

SUMMARY

The present disclosure provides an image processing method and apparatus, device, medium and program product, so as to solve the technical problem that currently when performing multiple deformations to a target in an image, the original image needs to be updated multiple times and thus the superimposed image is blurred.

In a first aspect, an embodiment of the present disclosure provides an image processing method, comprising:

Obtaining a deformation instruction sequence to act on a target object in a to-be-processed image, the deformation instruction sequence comprising multiple deformation instructions which are sequentially inputted;

Sequentially superimposing a deformation offset corresponding to each deformation instruction in the deformation instruction sequence on a to-be-processed image texture to determine a superimposed deformation image texture, wherein the to-be-processed image texture is an image texture corresponding to the to-be-processed image, and the resolution of the to-be-processed image texture is smaller than that of the to-be-processed image;

Deforming the target object in the to-be-processed image according to the superimposed deformation image texture to generate a processed image.

In a second aspect, an embodiment of the present disclosure provides an image processing apparatus, comprising:

A deformation instruction obtaining module, configured for obtaining a deformation instruction sequence to act on a target object in a to-be-processed image, the deformation instruction sequence comprising multiple deformation instructions which are sequentially inputted;

A deformation offset superimposing module, configured for sequentially superimposing a deformation offset corresponding to each deformation instruction in the deformation instruction sequence on a to-be-processed image texture to determine a superimposed deformation image texture, wherein the to-be-processed image texture is an image texture corresponding to the to-be-processed image, and the resolution of the to-be-processed image texture is smaller than that of the to-be-processed image;

A target object deforming module, configured for deforming the target object in the to-be-processed image according to the superimposed deformation image texture to generate a processed image.

In a third aspect, an embodiment of the present disclosure provides electronic device, comprising:

A processor; and

A memory, configured for storing a computer program of the processor;

wherein the processor is configured for performing an image processing method according to the first aspect and various possible designs of the first aspect by executing the computer program.

In a fourth aspect, an embodiment of the present disclosure provides a computer-readable storage medium, on which computer executable instructions are stored, the computer executable instructions, when executed by a processor, performing an image processing method according to the first aspect and various possible designs of the first aspect.

In a fifth aspect, an embodiment of the present disclosure further provides a computer program product, comprising computer instructions which, when executed by a processor, perform an image processing method according to the first aspect and various possible designs of the first aspect by executing the computer program.

In a sixth aspect, an embodiment of the present disclosure further provides a computer program which, when executed by a processor, performs an image processing method according to the first aspect and various possible designs of the first aspect by executing the computer program.

According to the image processing method, apparatus, device, medium and program product provided by the embodiments of the present disclosure, a deformation instruction sequence to act on a target object in a to-be-processed image is obtained, and then deformation offsets are sequentially superimposed on the to-be-processed image texture according to deformation instructions in the deformation instruction sequence to determine a superimposed deformation image texture, wherein the to-be-processed image texture is an image texture corresponding to the to-be-processed image, and the resolution of the to-be-processed image texture is smaller than that of the to-be-processed image. Finally, the target object in the to-be-processed image is deformed according to the superimposed deformation image texture to generate a processed image. It is obvious that when applying multiple deformation effect superimpositions to a to-be-processed image with high resolution, total deformation offset information is first accumulated using a to-be-processed image texture with low resolution, and then an interpolation operation is performed on the high-resolution picture based on the offset information in the superimposed deformation image texture. Since the superimposition of deformation effect offset is performed on the lower-resolution picture, the overhead is smaller; when multiple effects are superimposed on the mobile side, smooth operation can still be guaranteed. In addition, since only a single interpolation operation is performed, these is less loss of the picture quality.

BRIEF DESCRIPTION OF THE DRAWINGS

In order to more clearly illustrate the technical solution of the embodiments of the present disclosure or in the prior art, a brief introduction is presented below to the accompanying drawings used herein. It is obvious that the accompanying drawings to be described below are some embodiments of the present disclosure, and those of ordinary skill in the art may further obtain other drawings according to these accompanying drawings without the exercise of any inventive skill.

FIG. 4 shows a schematic flowchart of an image processing method according to still a further example embodiment of the present disclosure;

DETAILED DESCRIPTION OF EMBODIMENTS

Figure 1:
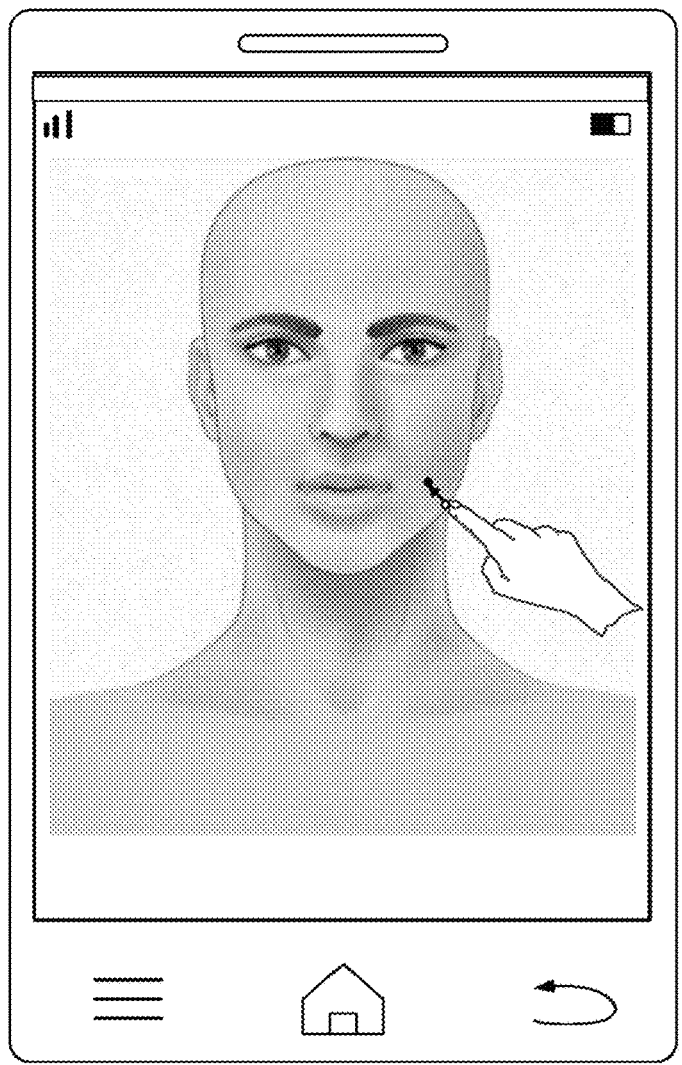
FIG. 1 shows an application scenario diagram of an image processing method according to an example embodiment of the present disclosure.

The embodiments of the present disclosure will be described in more detail with reference to the accompanying drawings, in which some embodiments of the present disclosure have been illustrated. However, it should be understood that the present disclosure can be implemented in various ways, and thus should not be construed to be limited to embodiments disclosed herein. On the contrary, those embodiments are provided for the thorough and complete understanding of the present disclosure. It should be understood that the drawings and embodiments of the present disclosure are only used for illustration, rather than limiting the protection scope of the present disclosure.

It should be understood that various steps described in method embodiments of the present disclosure may be performed in a different order and/or in parallel. In addition, the method implementations may comprise an additional step and/or omit a step which is shown. The scope of the present disclosure is not limited in this regard.

The term "comprise" and its variants used here are to be read as open terms that mean "include, but is not limited to." The term "based on" is to be read as "based at least in part on." The term "one embodiment" are to be read as "at least one embodiment." The term "another embodiment" is to be read as "at least one other embodiment." The term "some embodiments" are to be read as "at least some embodiments." Other definitions will be presented in the description below.

Note that the concepts "first," "second" and so on mentioned in the present disclosure are only for differentiating different apparatuses, modules or units rather than limiting the order or mutual dependency of functions performed by these apparatuses, modules or units.

Note that the modifications "one" and "a plurality" mentioned in the present disclosure are illustrative rather than limiting, and those skilled in the art should understand that unless otherwise specified, they should be understood as "one or more."

Image deformation is a common method in image processing, for example, face slimming, figure slimming, eye resizing and other deformation processing on a character in an image. Currently, the main flow of deformation algorithms for image deformation is as follows:

1. Calculating key points of a face or body in a to-be-processed image through a face and body key point model;
2. Moving key points according to deformation needs of a user, e.g., if there is a need to make a face smaller, then points of the lower jaw are moved towards the inside of the face;
3. Building a mesh based on key points;
4. Finally, resampling the image based on the mesh to obtain a deformed image result.

However, when the to-be-processed image contains a plurality of persons, the deformation effects need to be superimposed on each person or several different deformations need to be superimposed (e.g., big eyes, slim face, long legs and the like need to be superimposed), according to existing algorithms, a first deformation is processed, then an output result of the first deformation is used as an input of the next deformation, and the superimposition repeats until a final deformation result is obtained. When high-resolution pictures (e.g., pictures with more than 1200M pixels) are processed on the mobile side, this approach requires multiple operations on the high-resolution picture, which implies a serious performance problem. Each deformation effect requires an interpolation operation, which will blur the picture after multiple superimpositions.

In the present disclosure, it is intended to provide an image processing method, apparatus, device, medium and program product. In the method, a deformation instruction sequence to act on a target object in a to-be-processed image is obtained, and then deformation offsets are sequentially superimposed on the to-be-processed image texture according to deformation instructions in the deformation instruction sequence to determine a superimposed deformation image texture, wherein the to-be-processed image texture is an image texture corresponding to the to-be-processed image, and the resolution of the to-be-processed image texture is smaller than that of the to-be-processed image. Finally, the target object in the to-be-processed image is deformed according to the superimposed deformation image texture to generate a processed image. It is obvious that when applying multiple deformation effect superimpositions to a to-be-processed image with high resolution, total deformation offset information is first accumulated using a to-be-processed image texture with low resolution, and then an interpolation operation is performed on the high-resolution picture based on the offset information in the superimposed deformation image texture. Since the superimposition of deformation effect offset is performed on the lower-resolution picture, the overhead is smaller; when multiple effects are superimposed on the mobile side, smooth operation can still be guaranteed. In addition, since only a single interpolation operation is performed, these is less loss of the picture quality.

FIG. 1 is an application scenario diagram of an image processing method according to an example embodiment of the present disclosure. As shown in FIG. 1, the image processing method provided by this embodiment may be performed by a terminal device with a camera and a display screen. Specifically, a video of the target object (e.g., face, body, object, etc.) may be captured by a camera (e.g., front camera, rear camera, external camera, etc.) on the terminal device. In addition, a video of the target object may be obtained in a way of a user uploading locally stored video data or accepting video data captured by other terminal device.

Illustration is presented by taking a face as an example of the target object. In a possible scenario, after an image of the target object is captured using the terminal device, usually the captured image needs to be further processed. In an embodiment, the target object may comprise at least one of a face object, a body object and a thing object.

Taking a face object as an example of the target object, if there is a need to make the face smaller, then points of the lower jaw are moved towards the inside of the face. In the case of processing the face multiple times, if there is a need to make the face smaller and the eyes bigger, after points of the lower jaw are moved towards the inside of the face, points of the eyelids are moved outward, or points of the eyelids are moved outwards first and then points of the lower jaw are moved towards the inside of the face. In the method provided by this embodiment, deformation offsets are sequentially superimposed on the to-be-processed image texture according to deformation instructions in the deformation instruction sequence to determine the superimposed deformation image texture, wherein the to-be-processed image texture is an image texture corresponding to the to-be-processed image, and the resolution of the to-be-processed image texture is smaller than that of the to-be-processed image. Then, the target object in the to-be-processed image is deformed according to the superimposed deformation image texture to generate a processed image. It is obvious that in the method provided by this embodiment, the deformation offset corresponding to each deformation instruction is performed on the to-be-processed image texture with lower resolution, and after deformation offsets corresponding to all the deformation instructions are completed, the target object in the to-be-processed image is once more deformed through the superimposed deformation image texture. In this way, all the deformation offset corresponding to the deformation instruction is performed on the lower-resolution texture, which significantly reduces the computation load and improves the performance. Moreover, only a single interpolation operation is performed, which effectively prevents the image from blurring.

Figure 2:
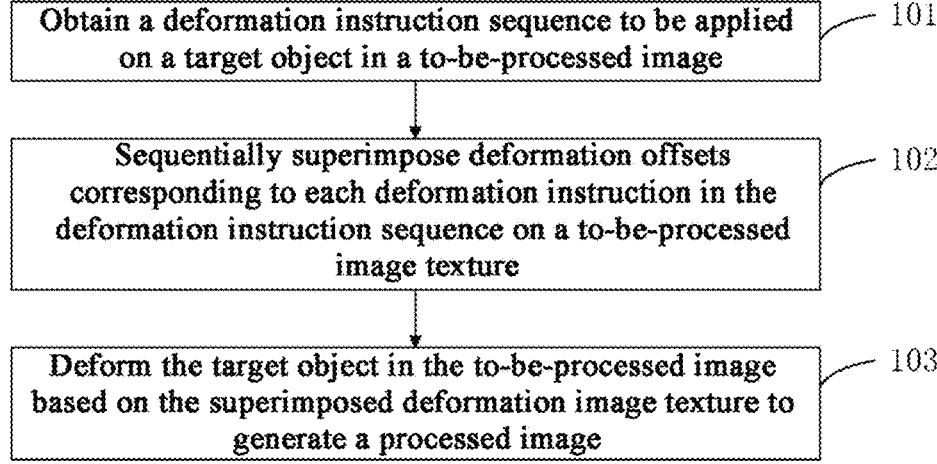
FIG. 2 shows a schematic flowchart of an image processing method according to an example embodiment of the present disclosure.

FIG. 2 shows a schematic flowchart of an image processing method according to an example embodiment of the present disclosure. As shown in FIG. 2, the image processing method provided by this embodiment comprises:

Step 101: obtaining a deformation instruction sequence to act to a target object in a to-be-processed image.

When the user needs to deform the target object in the to-be-processed image, a to-be-deformed area of the target object may be deformed by moving key points in the area. Illustration is presented with a face as the target object. By moving points of the lower jaw towards the inside of the face, the effect of face slimming may be achieved, and by moving joints of the eyelids outward, the effect of eye enlarging may be achieved.

When the to-be-processed image is processed by the user, usually multiple parts need to be deformed. Thus, in the processing, a deformation instruction sequence to act to the target object in the to-be-processed image may be obtained, wherein the deformation instruction sequence comprises multiple deformation instructions which are sequentially inputted, for example, including a face slimming deformation instruction and an eye enlarging deformation instruction which are sequentially inputted.

Step 102: sequentially superimposing a deformation offset corresponding to each deformation instruction in the deformation instruction sequence on a to-be-processed image texture to determine a superimposed deformation image texture.

After the deformation instruction sequence to act on the target object in the to-be-processed image is obtained, deformation offsets may be sequentially superimposed on the to-be-processed image texture according to deformation instructions in the deformation instruction sequence to determine a superimposed deformation image texture, wherein the to-be-processed image texture is an image texture corresponding to the to-be-processed image, and the resolution of the to-be-processed image texture is smaller than that of the to-be-processed image.

Specifically, a to-be-processed image texture may first be generated according to the to-be-process image, wherein the resolution of the to-be-processed image texture is smaller than that of the to-be-processed image. For example, the to-be-processed image may have 3000×4000 resolution, while the to-be-processed image texture may have 512×512 resolution.

Step 103: deforming the target object in the to-be-processed image according to the superimposed deformation image texture to generate a processed image.

In this embodiment, a deformation instruction sequence to act on a target object in a to-be-processed image is obtained, and then deformation offsets are sequentially superimposed on the to-be-processed image texture according to deformation instructions in the deformation instruction sequence to determine a superimposed deformation image texture, wherein the to-be-processed image texture is an image texture corresponding to the to-be-processed image, and the resolution of the to-be-processed image texture is smaller than that of the to-be-processed image. Finally, the target object in the to-be-processed image is deformed according to the superimposed deformation image texture to generate a processed image. It is obvious that when applying multiple deformation effect superimpositions to a to-be-processed image with high resolution, total deformation offset information is first accumulated using a to-be-processed image texture with low resolution, and then an interpolation operation is performed on the high-resolution picture based on the offset information in the superimposed deformation image texture. Since the superimposition of deformation effect offset is performed on the lower-resolution picture, the overhead is smaller; when multiple effects are superimposed on the mobile side, smooth operation can still be guaranteed. In addition, since only a single interpolation operation is performed, these is less loss of the picture quality.

Figure 3:
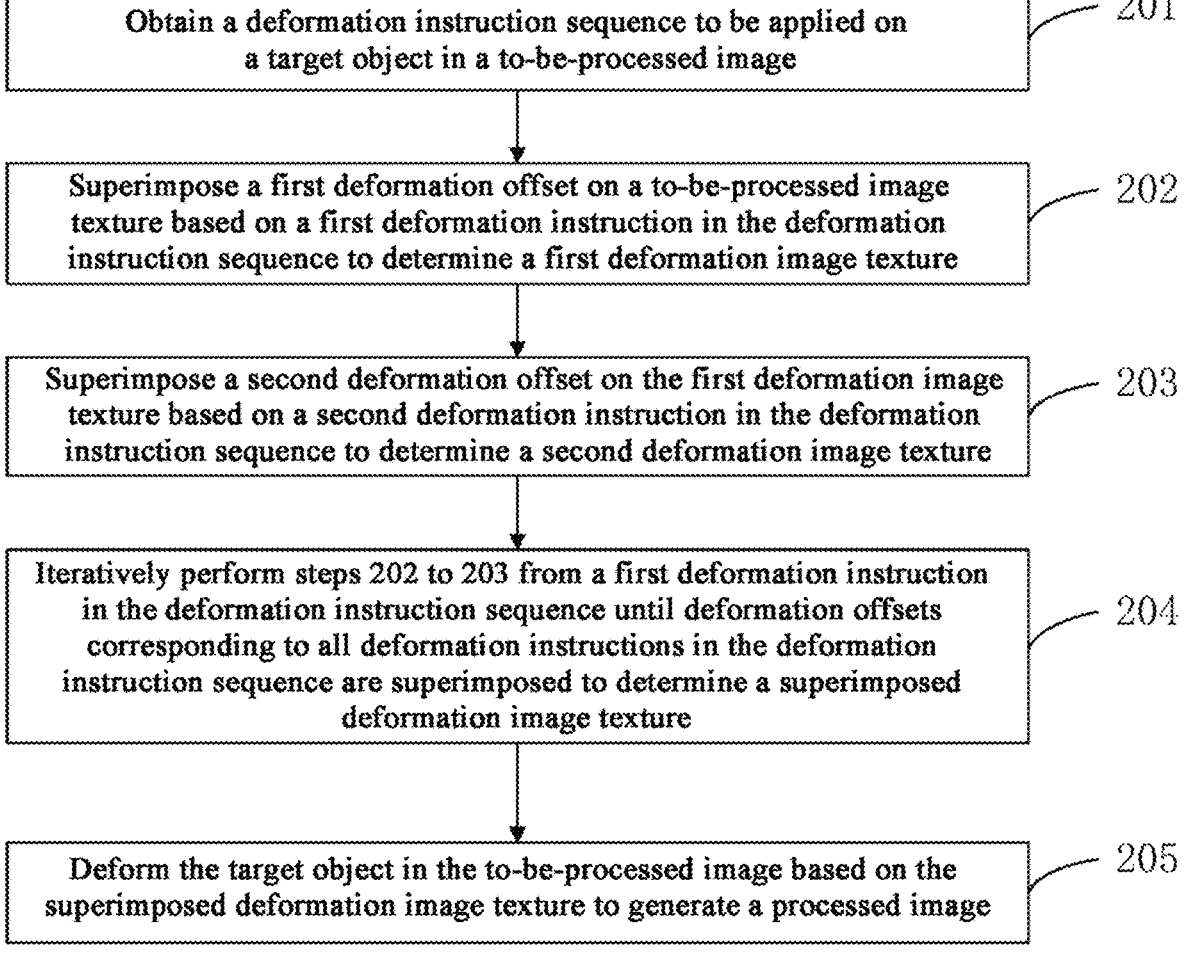
FIG. 3 shows a schematic flowchart of an image processing method according to a further example embodiment of the present disclosure.

FIG. 3 shows a schematic flowchart of an image processing method according to a further embodiment of the present disclosure. As shown FIG. 3, the image processing method provided by this embodiment comprises:

Step 201: obtaining a deformation instruction sequence to act to a target object in a to-be-processed image.

When the user needs to deform the target object in the to-be-processed image, a to-be-deformed area of the target object may be deformed by moving key points in the area. Illustration is presented with a face as the target object. By moving points of the lower jaw towards the inside of the face, the effect of face slimming may be achieved, and by moving joints of the eyelids outward, the effect of eye enlarging may be achieved.

When the to-be-processed image is processed by the user, usually multiple parts need to be deformed. Thus, in the processing, a deformation instruction sequence to act to the target object in the to-be-processed image may be obtained, wherein the deformation instruction sequence comprises multiple deformation instructions which are sequentially inputted, for example, including a face slimming deformation instruction and an eye enlarging deformation instruction which are sequentially inputted.

Step 202: superimposing a first deformation offset on a to-be-processed image texture according to a first deformation instruction in the deformation instruction sequence to determine a first deformation image texture.

Step 203: superimposing a second deformation offset on the first deformation image texture according to a second deformation instruction in the deformation instruction sequence to determine a second deformation image texture.

Step 204: iteratively performing steps 202 to 203 from the head deformation instruction in the deformation instruction sequence, until deformation offsets corresponding to all deformation instructions in the deformation instruction sequence are superimposed to determine a superimposed deformation image texture.

Specifically, a first deformation offset may be superimposed on the to-be-processed image texture according to a first deformation instruction in the deformation instruction sequence to determine a first deformation image texture; a second deformation offset may be superimposed on the first deformation image texture according to a second deformation instruction in the deformation instruction sequence to determine a second deformation image text; next, a third deformation offset may be superimposed on the second deformation image texture according to a third deformation instruction in the deformation instruction sequence to determine a third deformation image texture. Finally, deformation offsets corresponding to all deformation instructions in the deformation instruction sequence are superimposed to determine a superimposed deformation image texture.

For example, when the deformation instruction sequence comprises a face slimming deformation instruction and an eye enlarging deformation instruction which are sequentially inputted, a face slimming deformation offset may be superimposed on the to-be-processed image texture according to the face slimming deformation instruction in the deformation instruction sequence to determine a first deformation image texture, and then an eye enlarging deformation offset may be superimposed on the first deformation image texture according to the eye enlarging deformation instruction in the deformation instruction sequence to determine a superimposed deformation image texture.

In addition, the target object may further comprise a first target object and a second target object, at which point the first deformation instruction is used for deforming the first target object and the second deformation instruction is used for deforming the second target object.

For example, when the deformation instruction sequence comprises a face slimming deformation instruction and an eye enlarging deformation instruction which are sequentially inputted, the face slimming deformation instruction may be used for deforming a first target face, and the eye enlarging deformation instruction may be used for deforming a second target face. A face slimming deformation offset may be superimposed on the to-be-processed image texture, i.e., an area corresponding to the first target face, according to the face slimming deformation instruction to determine a first deformation image texture, and then an eye enlarging deformation offset may be superimposed on the first deformation image texture, i.e., an area corresponding to the second target face, according to the eye enlarging deformation instruction in the deformation instruction sequence to determine a superimposed deformation image texture.

Step 205: deforming the target object in the to-be-processed image according to the superimposed deformation image texture to generate a processed image.

After the superimposed deformation image texture is determined, the target object in the to-be-processed image may be deformed according to the superimposed deformation image texture to generate a processed image.

Specifically, a corresponding original key point position may be adjusted according to a position of a superimposed deformation key point, so that the adjusted original key point position overlaps the superimposed deformation key point position, wherein the superimposed deformation key point position is the position of a key point on the target object in the superimposed deformation image texture, the original key point position is the position of a key point on the target object in the to-be-processed image texture, and the processed image is an image generated after the position adjustment. It may be understood that in the position adjustment, by making reference to the position of each key point in the superimposed deformation image texture, each key point in the to-be-processed image texture is moved to the position of the corresponding key point in the superimposed deformation image texture, and then the processed image is generated.

As can be seen, when applying multiple deformation effect superimpositions to a to-be-processed image with high resolution, total deformation offset information is first accumulated using a to-be-processed image texture with low resolution, wherein the multiple deformation effect superimpositions may be on one target object or on multiple target objects. Finally, an interpolation operation is performed on the high-resolution picture based on the offset information in the superimposed deformation image texture, which can reduce the computation overhead. When multiple effects are superimposed on the mobile side, smooth operation can still be guaranteed. In addition, since only a single interpolation operation is performed, these is less loss of the picture quality.

FIG. 4 shows a schematic flowchart of an image processing method according to a still further example embodiment of the present disclosure. As shown in FIG. 4, the image processing method provided by this embodiment comprises:

Step 301: obtaining an initial key point set of a target object in a to-be-processed image.

In this step, the initial key point set of the target object in the to-be-processed image may be obtained with a preset key point model, wherein the initial key point set is used as initial position information of a to-be-processed image texture before a deformation offset is superimposed.

Figure 5:
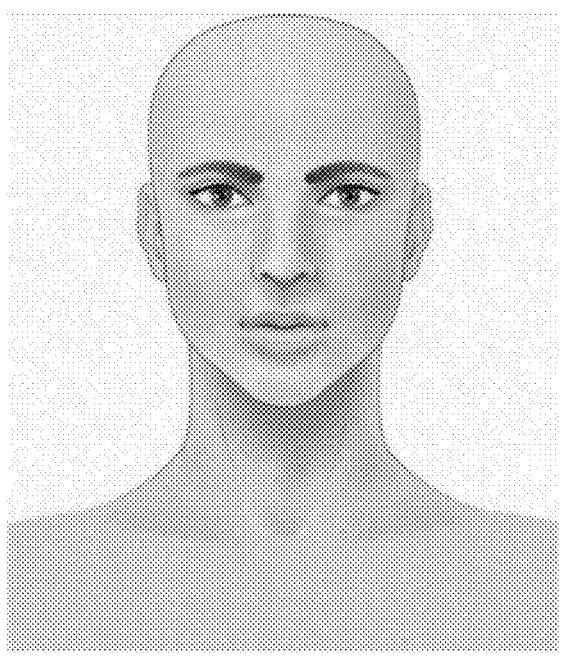
FIG. 5 shows a schematic diagram of a to-be-processed image in the embodiments of the present disclosure.

FIG. 5 shows a schematic diagram of a to-be-processed image in the embodiments of the present disclosure. As shown in FIG. 5, for an input original picture, i.e., a to-be-processed image, it may be named TexSrc, and a face initial key point set obtained with a preset key point model may be named PtsA.

Step 302: obtaining a deformation instruction sequence to act on the target object in the to-be-processed image.

When the to-be-processed image is processed by the user, usually multiple parts need to be deformed. Thus, in the processing, a deformation instruction sequence to act to the target object in the to-be-processed image may be obtained, wherein the deformation instruction sequence comprises multiple deformation instructions which are sequentially inputted, for example, including a face slimming deformation instruction and an eye enlarging deformation instruction which are sequentially inputted.

Figure 6:
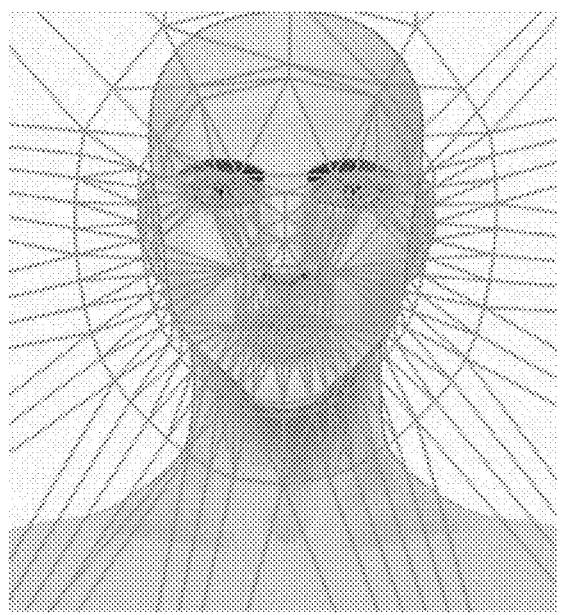
FIG. 6 shows a schematic diagram of a mesh built for an initial key point set in the embodiments of the present disclosure.

FIG. 6 shows a schematic diagram of a mesh built for the initial key point set in the embodiments of the present disclosure. As shown in FIG. 6, when the user needs to perform deformation processing on the target object in the to-be-processed image, the user may deform a to-be-deformed area of the target object by moving key points in the area.

Step 303: in response to a first deformation instruction, moving the position of at least one key point in the initial key point set to generated an adjusted key point set.

In this step, in response to a first deformation instruction, the position of at least one key point in the initial key point set is moved to generate an adjusted key point set. Illustration is presented with a face slimming deformation instruction as the first deformation instruction. By moving points of the lower jaw towards the inside of the face, the effect of face slimming may be achieved. That is, by performing a deformation offset operation on the face initial key point set PtsA, an adjusted key point set PtsB is obtained.

Figure 7:
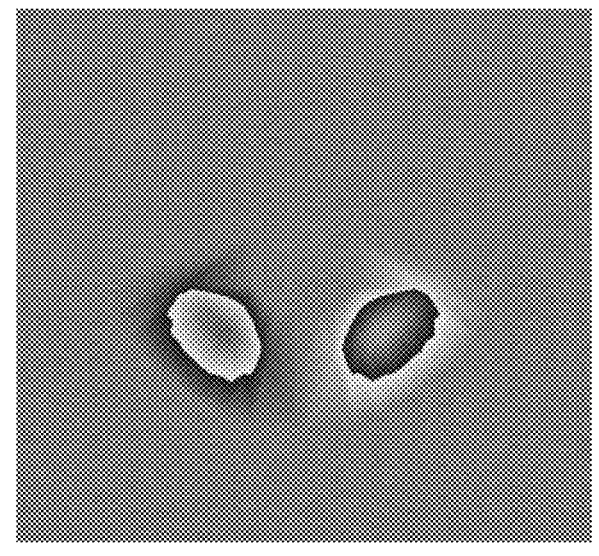
FIG. 7 shows a schematic diagram of offset existing in a deformation offset area in the embodiments of the present disclosure.

FIG. 7 shows a schematic diagram of the offset happening in a deformation offset area in the embodiments of the present disclosure. As shown in FIG. 7, in response to a face slimming deformation instruction, positions of key points of the lower jaw area in the initial key point set are moved, wherein an area without offset is shown in grey (light color). The current deformation operation is to slim the lower jaw, and it can be seen that there is an offset change in the jaw part (i.e., a darker colored area appears).

Step 304: generating a mesh according to the adjusted key point set.

In this step, a mesh may be generated according to the adjusted key point set, wherein vertex information of the mesh comprises initial position information of each key point of the initial key point set and adjusted position information of each key point of the adjusted key point set.

Figure 8:
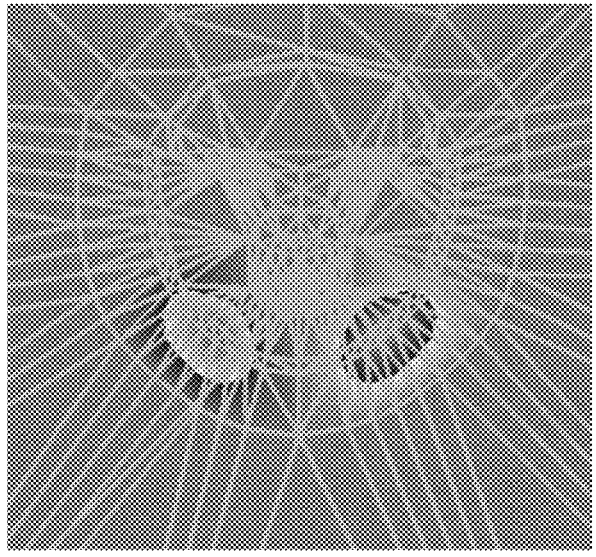
FIG. 8 shows a schematic diagram of a mesh built for an adjusted key point set in the embodiments of the present disclosure.

FIG. 8 shows a schematic view of a mesh built for the adjusted key point set in the embodiments of the present disclosure. As shown in FIG. 8, a mesh may be built using a triangulation algorithm according to the adjusted key point set PtsB, the face initial key point set PtsA is used as the uvA attribute of mesh vertexes, and the adjusted key point set PtsB is used as the uvB attribute of mesh vertexes.

Step 305: generating a to-be-processed image texture corresponding to the to-be-processed image.

Specifically, a to-be-processed image texture TexMap with a smaller size than a high-resolution to-be-processed image TexSrc may be created using a graphics library such as OpenGL (or other graphics libraries such as metal, vulkan, etc.).

Step 306: superimposing a first deformation offset on the to-be-processed image texture according to the first deformation instruction in the deformation instruction sequence to determine a first deformation image texture.

Then, in response to the first deformation instruction, the position of at least one key point in the initial key point set is moved to generate an adjusted key point set, and a mesh is generated according to the adjusted key point set, wherein vertex information of the mesh comprises initial position information of each key point in the initial key point set and adjusted position information of each key point in the adjusted key point set. Finally, a first deformation offset is superimposed on the to-be-processed image texture, wherein the first deformation offset of each key point is a difference value between the adjusted position information and the initial position information.

Here, in an embodiment, to be compatible with more devices (wherein some low-end machines do not support floating point textures), a floating-point offset will be converted to two 8-bit precision numbers to be saved, i.e., the first deformation offset corresponding to each vertex of the mesh will be saved as two 8-bit precision numbers, wherein the two 8-bit precision numbers are used for saving the integer part and the fractional part of the first deformation offset respectively, $$\text{float } a = \text{floor}(\text{offset} * 255.0)/255.0;$$

$$\text{float } b = \text{fract}(\text{offset} * 255.0);$$

$$\text{where offset} = (uvA - uvB).$$

It is noteworthy that float is a floating point data type, floor is a round down function, fract is a function that takes the fractional part of the number, and offset is the offset of each key point.

Step 307: superimposing a second deformation offset on the first deformation image texture according to the second deformation instruction in the deformation instruction sequence to determine a second deformation image texture.

When multiple deformations need to be superimposed, steps 301 to 306 may be repeated. For example, when there is a second deformation instruction in the deformation instruction sequence, with reference to the corresponding processing steps for the first deformation instruction in steps 301 to 306, a second deformation offset is superimposed on the first deformation image texture according to the second deformation instruction to determine a second deformation image texture.

Step 308: iteratively performing steps 202 to 203 from the head deformation instruction in the deformation instruction sequence until deformation offsets corresponding to all deformation instructions in the deformation instruction sequence are superimposed to determine a superimposed deformation image texture.

Specifically, a first deformation offset may be superimposed on the to-be-processed image texture according to a first deformation instruction in the deformation instruction sequence to determine a first deformation image texture; a second deformation offset may be superimposed on the first deformation image texture according to a second deformation instruction in the deformation instruction sequence to determine a second deformation image text; next, a third deformation offset may be superimposed on the second deformation image texture according to a third deformation instruction in the deformation instruction sequence to determine a third deformation image texture, until deformation offsets corresponding to all deformation instructions in the deformation instruction sequence are superimposed to determine a superimposed deformation image texture.

Step 309: deforming the target object in the to-be-processed image according to the superimposed deformation image texture to generate a processed image.

Figure 9:
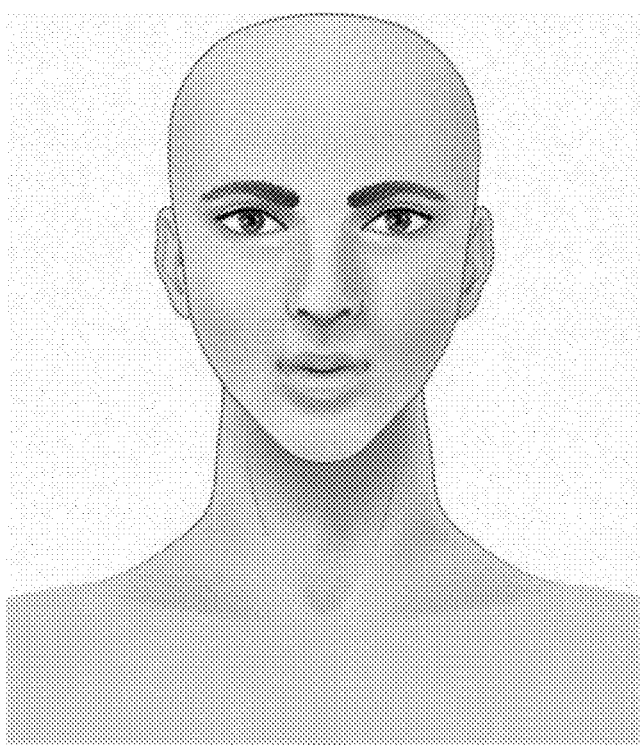
FIG. 9 is a processed image in the embodiments of the present disclosure.

FIG. 9 shows a processed image in the embodiments of the present disclosure. As shown in FIG. 9, the target object in the to-be-processed image is deformed according to the superimposed deformation image texture to generate a processed image. Specifically, the to-be-processed image TexSrc is offset through the superimposed deformation image texture TexMap to obtain the processed image TexDst. Specifically, suppose a value of TexMap at the coordinate CoordA is offsetA, then a value of TexDst at the coordinate CoordA is equal to a value of the to-be-processed image TexSrc at the coordinate (CoordA+offsetA). It is noteworthy that to obtain the offset of the superimposed deformation image texture TexMap, two 8-bit precision numbers need to be converted back to a floating point number, that is, two 8-bit precision numbers are added to obtain the floating point number.

In this embodiment, when applying multiple deformation effect superimpositions to a to-be-processed image with high resolution, total deformation offset information is first accumulated using a to-be-processed image texture with low resolution, and then an interpolation operation is performed on the high-resolution picture based on the offset information in the superimposed deformation image texture. Since the deformation effect offset superimposition is performed on the lower-resolution picture, the overhead is smaller. When multiple effects are superimposed on the mobile side, smooth operation can still be guaranteed. In addition, since only a single interpolation operation is performed, these is less loss of the picture quality.

Figure 10:
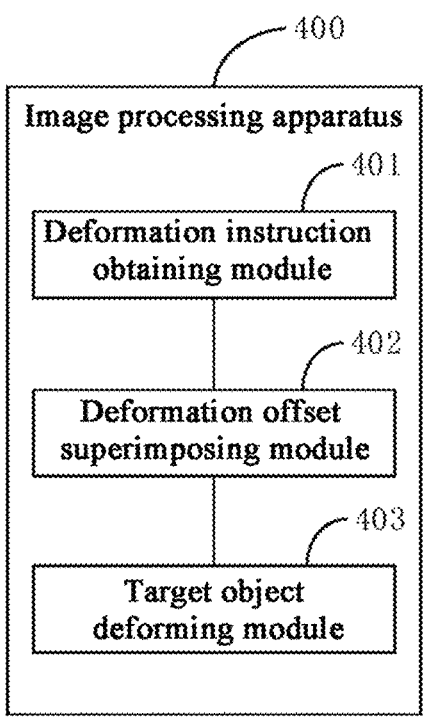
FIG. 10 shows a structural schematic diagram of an image processing apparatus according to an example embodiment of the present disclosure.

FIG. 10 is a structural schematic diagram of an image processing apparatus according to an example embodiment of the present disclosure. As shown in FIG. 10, an image processing apparatus 400 provided by this embodiment comprises:

A deformation instruction obtaining module 401, configured for obtaining a deformation instruction sequence to act on a target object in a to-be-processed image, the deformation instruction sequence comprising multiple deformation instructions which are sequentially inputted;

A deformation offset superimposing module 402, configured for sequentially superimposing a deformation offset corresponding to each deformation instruction in the deformation instruction sequence on a to-be-processed image texture to determine a superimposed deformation image texture, wherein the to-be-processed image texture is an image texture corresponding to the to-be-processed image, and the resolution of the to-be-processed image texture is smaller than that of the to-be-processed image;

A target object deforming module 403, configured for deforming the target object in the to-be-processed image according to the superimposed deformation image texture to generate a processed image.

In a possible design, the deformation offset superimposing module 402 is specifically configured for:

Step 1: superimposing a first deformation offset on the to-be-processed image texture according to a first deformation instruction in the deformation instruction sequence to determine a first deformation image texture;

Step 2: superimposing a second deformation offset on the first deformation image texture according to a second deformation instruction in the deformation instruction sequence to determine a second deformation image texture, the second deformation instruction being a subsequent instruction of the first deformation instruction;

Iteratively performing steps 1 to 2 from the head deformation instruction in the deformation instruction sequence, until deformation offsets corresponding to all deformation instructions in the deformation instruction sequence are superimposed to determine the superimposed deformation image texture.

In a possible design, if the target object comprises a first target object and a second target object, then the first deformation instruction is used for deforming the first target object, and the second deformation instruction is used for deforming the second target object.

In a possible design, the deformation offset superimposing module 402 is further configured for:

Performing, according to a position of a superimposed deformation key point, a position adjustment to a position of a corresponding original key point to cause the adjusted position of the original key point overlap the position of the superimposed deformation key point, the position of the superimposed deformation key point being the position of a key point on the target object in the superimposed deformation image texture, the position of the original key point being the position of a key point on the target object in the to-be-processed image texture, the processed image being an image generated after the position adjustment.

Figure 11:
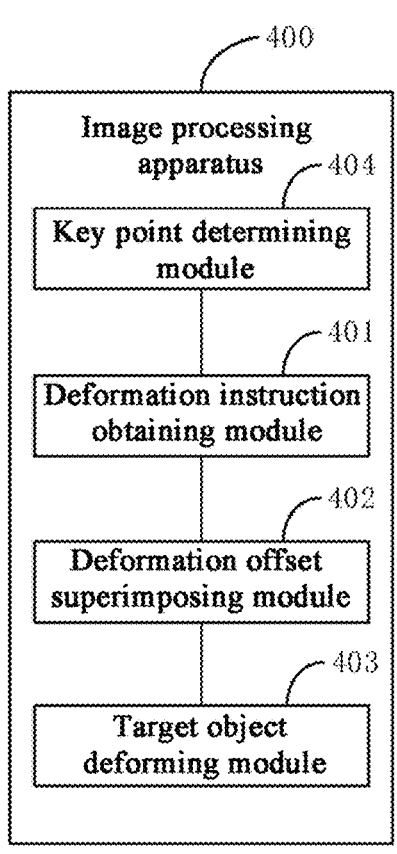
FIG. 11 shows a structural schematic diagram of an image processing apparatus according to a further example embodiment of the present disclosure.

Based on the embodiment shown in FIG. 10, FIG. 11 is a structural schematic diagram of an image processing apparatus according to a further example embodiment of the present disclosure. As shown in FIG. 11, an image processing apparatus 400 provided by this embodiment further comprises:

A key point determining module 404, configured for obtaining an initial key point set of the target object in the to-be-processed image, the initial key point set being used as initial position information of the to-be-processed image texture before a deformation offset is superimposed.

In a possible design, the deformation offset superimposing module 402 is specifically configured for:

In response to the first deformation instruction, moving the position of at least one key point in the initial key point set to generate an adjusted key point set, the first deformation instruction being applied on the at least one key point to cause the at least one key point be offset;

Generating a mesh according to the adjusted key point set, vertex information of the mesh comprising initial position information of each key point in the initial key point set and adjusted position information of each key point in the adjusted key point set;

Obtaining a difference value between the adjusted position information and the initial position information as a first deformation offset of each key point;

Superimposing the first deformation offset on the to-be-processed image texture to determine the first deformation image texture.

It is noteworthy that the image processing apparatus provided by the embodiments shown in FIGS. 10 and 11 may be used for performing the method steps provided by any of the above method embodiments, with similar implementation and technical effects, which is not detailed here.

Figure 12:
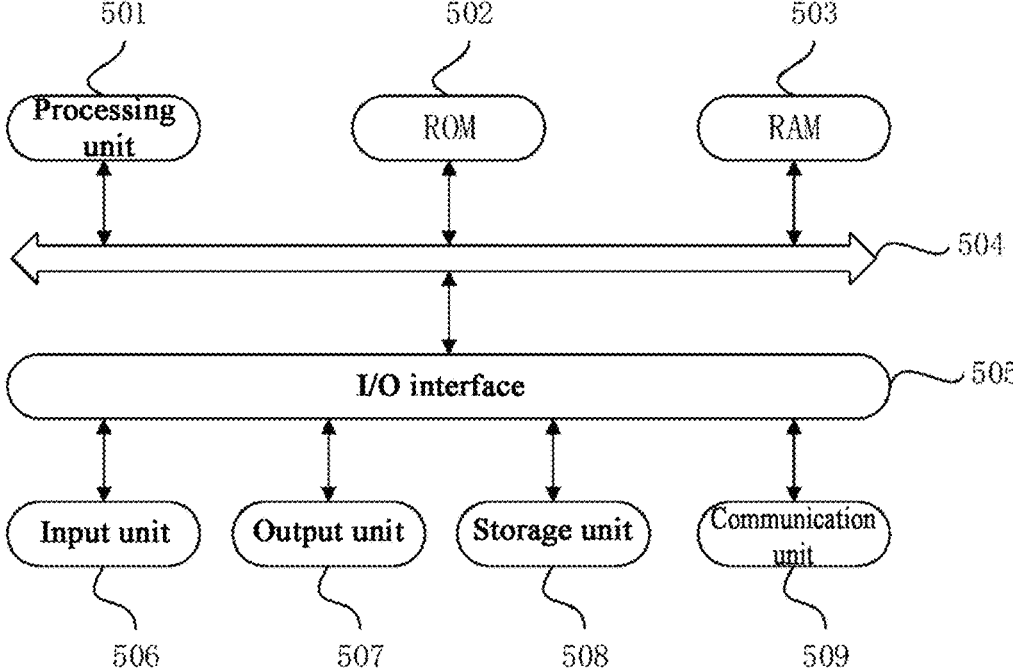
FIG. 12 shows a structural schematic diagram of an electronic device according to an example embodiment of the present disclosure.

FIG. 12 shows a structural schematic diagram of an electronic device according to an example embodiment of the present disclosure. As shown in FIG. 12, this figure shows a structural schematic diagram of an electronic device 500 suitable for implementing the embodiments of the present disclosure. The terminal device in the embodiments of the present disclosure may include, without limitation to, a mobile terminal with an image capturing function, such as a mobile phone, a laptop computer, a digital broadcast receiver, a PDA (personal digital assistant), a portable android device (PAD), a portable multimedia player (PMP), an on-board terminal (e.g., on-board navigation terminal), a wearable electronic device and the like, as well as a fixed terminal with an external image capturing device, such as a digital TV, a desktop computer and the like. The electronic device shown in FIG. 12 is merely an example and should not be construed to impose any limitations on the functionality and use scope of the embodiments of the present disclosure.

As shown in FIG. 12, the electronic device 500 may comprise a processor (e.g., a central processor, a graphics processor) 501 which is capable of performing various appropriate actions and processes in accordance with programs stored in a read only memory (ROM) 502 or programs loaded from a storage unit 508 to a random access memory (RAM) 503. In the RAM 503, there are also stored various programs and data required by the electronic device 500 when operating. The processor 501, the ROM 502 and the RAM 503 are connected to one another via a bus 504. An input/output (I/O) interface 505 is also connected to the bus 504. The memory is configured for storing programs for performing the video processing method described in the above various method embodiments; the processor is configured for executing programs stored in the memory.

Usually, the following units may be connected to the I/O interface 505: an input unit 506 including a touch screen, a touch pad, a keyboard, a mouse, a camera, a microphone, an accelerometer, a gyroscope, or the like; an output unit 507, such as a liquid-crystal display (LCD), a loudspeaker, a vibrator, or the like; a storage unit 508, such as a magnetic tape, a hard disk or the like; and a communication unit 509. The communication unit 509 allows the electronic device to perform wireless or wired communication with other device so as to exchange data with other device. While FIG. 12 shows the electronic device 500 with various units, it should be understood that it is not required to implement or have all of the illustrated units. Alternatively, more or less units may be implemented or exist.

Specifically, according to the embodiments of the present disclosure, the procedures described with reference to the flowchart may be implemented as computer software programs. For example, the embodiments of the present disclosure comprise a computer program product that comprises a computer program embodied on a non-transitory computer-readable medium, the computer program including program codes for executing the method shown in the flowchart. In such an embodiment, the computer program may be loaded and installed from a network via the communication unit 509, or installed from the storage unit 508, or installed from the ROM 502. The computer program, when executed by the processing unit 501, perform the above functions defined in the method of the embodiments of the present disclosure.

It is noteworthy that the computer readable medium of the present disclosure can be a computer readable signal medium, a computer readable storage medium or any combination thereof. The computer readable storage medium may be, for example, but is not limited to, an electronic, magnetic, optical, electromagnetic, infrared or semiconductor system, apparatus or device, or any combination of the foregoing. More specific examples of the computer readable storage medium may include, without limitation to, the following: an electrical connection with one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium containing or storing a program which may be used by an instruction executing system, apparatus or device or used in conjunction therewith. In the present disclosure, the computer readable signal medium may include a data signal propagated in baseband or as part of a carrier wave, with computer readable program code carried therein. The data signal propagated as such may take various forms, including without limitation to, an electromagnetic signal, an optical signal or any suitable combination of the foregoing. The computer readable signal medium may further be any other computer readable medium than the computer readable storage medium, which computer readable signal medium may send, propagate or transmit a program used by an instruction executing system, apparatus or device or used in conjunction with the foregoing. The program code included in the computer readable medium may be transmitted using any suitable medium, including without limitation to, an electrical wire, an optical fiber cable, RF (radio frequency), etc., or any suitable combination of the foregoing.

The above computer readable medium may be included in the above-mentioned electronic device; and it may also exist alone without being assembled into the electronic device.

The computer readable storage medium carries one or more programs which, when executed by an electronic device, cause the electronic device to: obtain a deformation instruction sequence to act on a target object in a to-be-processed image, the deformation instruction sequence comprising multiple deformation instructions which are sequentially inputted; sequentially superimpose a deformation offset corresponding to each deformation instruction in the deformation instruction sequence on a to-be-processed image texture to determine a superimposed deformation image texture, wherein the to-be-processed image texture is an image texture corresponding to the to-be-processed image, and the resolution of the to-be-processed image texture is smaller than that of the to-be-processed image; deform the target object in the to-be-processed image according to the superimposed deformation image texture to generate a processed image.

Computer program codes for carrying out operations of the present disclosure may be written in one or more programming languages, including without limitation to, an object oriented programming language such as Java, Small-talk, C++ or the like, and conventional procedural program-ming languages, such as the "C" programming language or similar programming languages. The program codes may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some implementations, the client and the server may communicate using any network protocol that is currently known or will be developed in future, such as the hyper text transfer protocol (HTTP) and the like, and may be intercon-nected with digital data communication (e.g., communica-tion network) in any form or medium. Examples of com-munication networks include local area networks (LANs), wide area networks (WANs), inter-networks (e.g., the Inter-net) and end-to-end networks (e.g., ad hoc end-to-end net-works), as well as any networks that are currently known or will be developed in future.

The flowchart and block diagrams in the figures illustrate the architecture, functionality, and operation of possible implementations of systems, methods and computer pro-gram products according to various implementations of the present disclosure. In this regard, each block in the flowchart or block diagrams may represent a module, segment, or portion of code, which comprises one or more executable instructions for implementing the specified logical function (s). It should also be noted that, in some alternative imple-mentations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The modules described in the embodiments of the present disclosure may be implemented as software or hardware. Wherein the name of a module does not form any limitation to the module per se. For example, the display module may further be described as a "unit for displaying an object face and face mask sequence."

The functions described above may be executed, at least in part, by one or more hardware logic components. For example, and without limitation, illustrative types of hard-ware logic components that can be used include Field-programmable Gate Arrays (FPGAs), Application-specific Integrated Circuits (ASICs), Application-specific Standard Products (ASSPs), System-on-a-chip systems (SOCs), Com-plex Programmable Logic Devices (CPLDs), etc.

In the context of the present disclosure, the machine readable medium may be a tangible medium, which may include or store a program used by an instruction executing system, apparatus or device or used in conjunction with the foregoing. The machine readable medium may be a machine readable signal medium or a machine readable storage medium. The machine readable medium may include, but is not limited to, an electronic, magnetic, optical, electromag-netic, infrared, semiconductor system, units or device, or any suitable combination of the foregoing. More specific examples of the machine readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In a first aspect, according to one or more embodiments of the present disclosure, an image processing method is provided, comprising:

Obtaining a deformation instruction sequence to act on a target object in a to-be-processed image, the deforma-tion instruction sequence comprising multiple defor-mation instructions which are sequentially inputted;

Sequentially superimposing a deformation offset corre-sponding to each deformation instruction in the defor-mation instruction sequence on a to-be-processed image texture to determine a superimposed deforma-tion image texture, wherein the to-be-processed image texture is an image texture corresponding to the to-be-processed image, and the resolution of the to-be-pro-cessed image texture is smaller than that of the to-be-processed image;

Deforming the target object in the to-be-processed image according to the superimposed deformation image tex-ture to generate a processed image.

In a possible design, the sequentially superimposing a deformation offset corresponding to each deformation instruction in the deformation instruction sequence on a to-be-processed image texture to determine a superimposed deformation image texture comprises:

Step 1: superimposing a first deformation offset on the to-be-processed image texture according to a first deformation instruction in the deformation instruction sequence to determine a first deformation image tex-ture;

Step 2: superimposing a second deformation offset on the first deformation image texture according to a second deformation instruction in the deformation instruction sequence to determine a second deformation image texture, the second deformation instruction being a subsequent instruction of the first deformation instruc-tion;

Iteratively performing steps 1 to 2 from the head defor-mation instruction in the deformation instruction sequence, until deformation offsets corresponding to all deformation instructions in the deformation instruction sequence are superimposed to determine the superim-posed deformation image texture.

In a possible design, the target object comprises a first target object and a second target object, the first deformation instruction is used for deforming the first target object, and the second deformation instruction is used for deforming the second target object.

In a possible design, the deforming the target object in the to-be-processed image according to the superimposed defor-mation image texture to generate a processed image com-prises:

Performing, according to a position of a superimposed deformation key point, a position adjustment to a position of a corresponding original key point to cause the adjusted position of the original key point overlap the position of the superimposed deformation key point, the position of the superimposed deformation key point being the position of a key point on the target object in the superimposed deformation image texture, the position of the original key point being the position of a key point on the target object in the to-be-processed image texture, the processed image being an image generated after the position adjustment.

In a possible design, before the sequentially superimposing a deformation offset corresponding to each deformation instruction in the deformation instruction sequence on a to-be-processed image texture to determine a superimposed deformation image texture, there is further comprised:

Obtaining an initial key point set of the target object in the to-be-processed image, the initial key point set being used as initial position information of the to-be-processed image texture before a deformation offset is superimposed.

In a possible design, the, if the first deformation instruction is a head instruction in the deformation instruction sequence, superimposing a first deformation offset on the to-be-processed image texture according to the first deformation instruction in the deformation instruction sequence to determine a first deformation image texture comprises:

In response to the first deformation instruction, moving the position of at least one key point in the initial key point set to generate an adjusted key point set, the first deformation instruction being applied on the at least one key point to cause the at least one key point be offset;

Generating a mesh according to the adjusted key point set, vertex information of the mesh comprising initial position information of each key point in the initial key point set and adjusted position information of each key point in the adjusted key point set;

Obtaining a difference value between the adjusted position information and the initial position information as a first deformation offset of each key point;

Superimposing the first deformation offset on the to-be-processed image texture to determine the first deformation image texture.

In a possible design, the first deformation offset corresponding to each mesh vertex of the mesh is saved as two 8-precision numbers, the two 2-precision numbers being used for saving an integer part and fractional part of the first deformation offset respectively.

In a second aspect, according to one or more embodiments of the present disclosure, an image processing apparatus is provided, comprising:

A deformation instruction obtaining module, configured for obtaining a deformation instruction sequence to act on a target object in a to-be-processed image, the deformation instruction sequence comprising multiple deformation instructions which are sequentially inputted;

A deformation offset superimposing module, configured for sequentially superimposing a deformation offset corresponding to each deformation instruction in the deformation instruction sequence on a to-be-processed image texture to determine a superimposed deformation image texture, wherein the to-be-processed image texture is an image texture corresponding to the to-be-processed image, and the resolution of the to-be-processed image texture is smaller than that of the to-be-processed image;

A target object deforming module, configured for deforming the target object in the to-be-processed image according to the superimposed deformation image texture to generate a processed image.

In a possible design, the deformation offset superimposing module is specifically configured for:

Step 1: superimposing a first deformation offset on the to-be-processed image texture according to a first deformation instruction in the deformation instruction sequence to determine a first deformation image texture;

Step 2: superimposing a second deformation offset on the first deformation image texture according to a second deformation instruction in the deformation instruction sequence to determine a second deformation image texture, the second deformation instruction being a subsequent instruction of the first deformation instruction;

Iteratively performing steps 1 to 2 from the head deformation instruction in the deformation instruction sequence, until deformation offsets corresponding to all deformation instructions in the deformation instruction sequence are superimposed to determine the superimposed deformation image texture.

In a possible design, if the target object comprises a first target object and a second target object, then the first deformation instruction is used for deforming the first target object, and the second deformation instruction is used for deforming the second target object.

In a possible design, the deformation offset superimposing module is further configured for:

Performing, according to a position of a superimposed deformation key point, a position adjustment to a position of a corresponding original key point to cause the adjusted position of the original key point overlap the position of the superimposed deformation key point, the position of the superimposed deformation key point being the position of a key point on the target object in the superimposed deformation image texture, the position of the original key point being the position of a key point on the target object in the to-be-processed image texture, the processed image being an image generated after the position adjustment.

In a possible design, the image processing apparatus further comprises:

A key point determining module, configured for obtaining an initial key point set of the target object in the to-be-processed image, the initial key point set being used as initial position information of the to-be-processed image texture before a deformation offset is superimposed.

In a possible design, the deformation offset superimposing module is specifically configured for:

In response to the first deformation instruction, moving the position of at least one key point in the initial key point set to generate an adjusted key point set, the first deformation instruction being applied on the at least one key point to cause the at least one key point be offset;

Generating a mesh according to the adjusted key point set, vertex information of the mesh comprising initial position information of each key point in the initial key point set and adjusted position information of each key point in the adjusted key point set;

Obtaining a difference value between the adjusted position information and the initial position information as a first deformation offset of each key point;

Superimposing the first deformation offset on the to-be-processed image texture to determine the first deformation image texture.

In a third aspect, an embodiment of the present disclosure provides an electronic device, comprising:

A processor; and

A memory, configured for storing a computer program of the processor;

Wherein the processor is configured for performing an image processing method according to the first aspect and various possible designs of the first aspect by executing the computer program.

In a fourth aspect, an embodiment of the present disclosure provides a computer-readable storage medium, on which computer executable instructions are stored, the computer executable instructions, when executed by a processor, performing an image processing method according to the first aspect and various possible designs of the first aspect.

In a fifth aspect, an embodiment of the present disclosure further provides a computer program product, comprising computer instructions which, when executed by a processor, perform an image processing method according to the first aspect and various possible designs of the first aspect by executing the computer program.

In a sixth aspect, an embodiment of the present disclosure further provides a computer program which, when executed by a processor, performs an image processing method according to the first aspect and various possible designs of the first aspect by executing the computer program.

The foregoing description merely illustrates the preferable embodiments of the present disclosure and used technical principles. Those skilled in the art should understand that the scope of the present disclosure is not limited to technical solutions formed by specific combinations of the foregoing technical features and also cover other technical solution formed by any combinations of the foregoing or equivalent features without departing from the concept of the present disclosure, such as a technical solution formed by replacing the foregoing features with the technical features disclosed in the present disclosure (but not limited to) with similar functions.

In addition, although various operations are depicted in a particular order, this should not be construed as requiring that these operations be performed in the particular order shown or in a sequential order. In a given environment, multitasking and parallel processing may be advantageous. Likewise, although the above discussion contains several specific implementation details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or method logical acts, it is to be understood that the subject matter defined in the appended claims is not necessarily limited to the specific features or acts described above. On the contrary, the specific features and acts described above are merely example forms of implementing the claims.

What is claimed is:

1. An image processing method, comprising:

obtaining a deformation instruction sequence to be applied on an object in an image, the deformation instruction sequence comprising a plurality of deformation instructions which are sequentially inputted;

sequentially superimposing a deformation offset corresponding to each deformation instruction in the deformation instruction sequence on an image texture to determine a superimposed deformation image texture that embodies an accumulated deformation offset of the deformation instruction sequence, wherein the image texture is an image texture corresponding to the image, and a resolution of the image texture is smaller than that of the image; and deforming the object in the image according to the superimposed deformation image texture to generate a processed image;

wherein deforming the object in the image based on the superimposed deformation image texture to generate the processed image comprises:

performing, according to a position of a superimposed deformation key point, a position adjustment to a position of a corresponding original key point to cause the adjusted position of the original key point to overlap the position of the superimposed deformation key point, the position of the superimposed deformation key point being a position of a key point on the object in the superimposed deformation image texture, the position of the original key point being a position of a key point on the object in the image texture, the processed image being an image generated after the position adjustment.

2. The image processing method of claim 1, wherein sequentially superimposing the deformation offset corresponding to each deformation instruction in the deformation instruction sequence on the image texture to determine the superimposed deformation image texture comprises:

step 1: superimposing a first deformation offset on the image texture based on a first deformation instruction in the deformation instruction sequence to determine a first deformation image texture;

step 2: superimposing a second deformation offset on the first deformation image texture based on a second deformation instruction in the deformation instruction sequence to determine a second deformation image texture, the second deformation instruction being a subsequent instruction of the first deformation instruction; and iteratively performing steps 1 to 2 from the first deformation instruction in the deformation instruction sequence, until deformation offsets corresponding to all deformation instructions in the deformation instruction sequence are superimposed to determine the superimposed deformation image texture.

3. The image processing method of claim 2, wherein the object comprises a first object and a second object, the first deformation instruction is used for deforming the first object, and the second deformation instruction is used for deforming the second object.

4. The image processing method of claim 2, wherein before iteratively superimposing the first deformation offset or the second deformation offset corresponding to each deformation instruction in the deformation instruction sequence on the image texture to determine the superimposed deformation image texture, the image processing method further comprises:

obtaining an initial key point set of the object in the image, the initial key point set being used as initial position information of the image texture before the first deformation offset or the second deformation offset is superimposed.

5. The image processing method of claim 4, wherein in case that the first deformation instruction is a head instruction in the deformation instruction sequence, superimposing the first deformation offset on the image texture based on the first deformation instruction in the deformation instruction sequence to determine the first deformation image texture comprises:

in response to the first deformation instruction, moving a position of at least one key point in the initial key point set to generate an adjusted key point set, the first deformation instruction being applied on the at least one key point to cause the at least one key point to be offset;

generating a mesh based on the adjusted key point set, vertex information of the mesh comprising initial position information of each key point in the initial key point set and adjusted position information of each key point in the adjusted key point set;

obtaining a difference value between the adjusted position information and the initial position information as a first deformation offset of each key point; and superimposing the first deformation offset on the image texture to determine the first deformation image texture.

6. The image processing method of claim 5, wherein the first deformation offset corresponding to each mesh vertex of the mesh is stored in two 8-bit precision numbers, the two 8-bit precision numbers being used for storing an integer part and a fractional part of the first deformation offset respectively.

7. An electronic device, comprising:

a processor; and a memory, configured for storing a computer program;

wherein the processor is configured for performing an image processing method comprising:

obtaining a deformation instruction sequence to be applied on an object in an image, the deformation instruction sequence comprising a plurality of deformation instructions which are sequentially inputted;

sequentially superimposing a deformation offset corresponding to each deformation instruction in the deformation instruction sequence on an image texture to determine a superimposed deformation image texture that embodies an accumulated deformation offset of the deformation instruction sequence, wherein the image texture is an image texture corresponding to the image, and a resolution of the image texture is smaller than that of the image; and deforming the object in the image according to the superimposed deformation image texture to generate a processed image;

wherein deforming the object in the image based on the superimposed deformation image texture to generate the processed image comprises:

performing, according to a position of a superimposed deformation key point, a position adjustment to a position of a corresponding original key point to cause the adjusted position of the original key point to overlap the position of the superimposed deformation key point, the position of the superimposed deformation key point being a position of a key point on the object in the superimposed deformation image texture, the position of the original key point being a position of a key point on the object in the image texture, the processed image being an image generated after the position adjustment.

8. The electronic device of claim 7, wherein sequentially superimposing the deformation offset corresponding to each deformation instruction in the deformation instruction sequence on the image texture to determine the superimposed deformation image texture comprises:

step 1: superimposing a first deformation offset on the image texture based on a first deformation instruction in the deformation instruction sequence to determine a first deformation image texture;

step 2: superimposing a second deformation offset on the first deformation image texture based on a second deformation instruction in the deformation instruction sequence to determine a second deformation image texture, the second deformation instruction being a subsequent instruction of the first deformation instruction; and iteratively performing steps 1 to 2 from the first deformation instruction in the deformation instruction sequence, until deformation offsets corresponding to all deformation instructions in the deformation instruction sequence are superimposed to determine the superimposed deformation image texture.

9. The electronic device of claim 8, wherein the object comprises a first object and a second object, the first deformation instruction is used for deforming the first object, and the second deformation instruction is used for deforming the second object.

10. The electronic device of claim 8, wherein before iteratively superimposing the first deformation offset or the second deformation offset corresponding to each deformation instruction in the deformation instruction sequence on the image texture to determine the superimposed deformation image texture, the image processing method further comprises:

obtaining an initial key point set of the object in the image, the initial key point set being used as initial position information of the image texture before the first deformation offset or the second deformation offset is superimposed.

11. The electronic device of claim 10, wherein in case that the first deformation instruction is a head instruction in the deformation instruction sequence, superimposing the first deformation offset on the image texture based on the first deformation instruction in the deformation instruction sequence to determine the first deformation image texture comprises:

in response to the first deformation instruction, moving a position of at least one key point in the initial key point set to generate an adjusted key point set, the first deformation instruction being applied on the at least one key point to cause the at least one key point to be offset;

generating a mesh based on the adjusted key point set, vertex information of the mesh comprising initial position information of each key point in the initial key point set and adjusted position information of each key point in the adjusted key point set;

obtaining a difference value between the adjusted position information and the initial position information as a first deformation offset of each key point; and superimposing the first deformation offset on the image texture to determine the first deformation image texture.

12. The electronic device of claim 11, wherein the first deformation offset corresponding to each mesh vertex of the mesh is stored in two 8-bit precision numbers, the two 8-bit precision numbers being used for storing an integer part and a fractional part of the first deformation offset respectively.

13. A computer program product being stored on a non-transitory computer storage medium comprising computer instructions which, when executed by a processor, cause the processor to perform an image processing method comprising:

obtaining a deformation instruction sequence to be applied on an object in an image, the deformation instruction sequence comprising a plurality of deformation instructions which are sequentially inputted;

sequentially superimposing a deformation offset corresponding to each deformation instruction in the deformation instruction sequence on an image texture to determine a superimposed deformation image texture that embodies an accumulated deformation offset of the deformation instruction sequence, wherein the image texture is an image texture corresponding to the image, and a resolution of the image texture is smaller than that of the image; and deforming the object in the image according to the superimposed deformation image texture to generate a processed image;

wherein deforming the object in the image based on the superimposed deformation image texture to generate the processed image comprises:

performing, according to a position of a superimposed deformation key point, a position adjustment to a position of a corresponding original key point to cause the adjusted position of the original key point to overlap the position of the superimposed deformation key point, the position of the superimposed deformation key point being a position of a key point on the object in the superimposed deformation image texture, the position of the original key point being a position of a key point on the object in the image texture, the processed image being an image generated after the position adjustment.

14. The computer program product of claim 13, wherein sequentially superimposing the deformation offset corresponding to each deformation instruction in the deformation instruction sequence on the image texture to determine the superimposed deformation image texture comprises:

step 1: superimposing a first deformation offset on the image texture based on a first deformation instruction in the deformation instruction sequence to determine a first deformation image texture;

step 2: superimposing a second deformation offset on the first deformation image texture based on a second deformation instruction in the deformation instruction sequence to determine a second deformation image texture, the second deformation instruction being a subsequent instruction of the first deformation instruction; and iteratively performing steps 1 to 2 from the first deformation instruction in the deformation instruction sequence, until deformation offsets corresponding to all deformation instructions in the deformation instruction sequence are superimposed to determine the superimposed deformation image texture.

15. The computer program product of claim 14, wherein the object comprises a first object and a second object, the first deformation instruction is used for deforming the first object, and the second deformation instruction is used for deforming the second object.

16. The computer program product of claim 14, wherein before iteratively superimposing the first deformation offset or the second deformation offset corresponding to each deformation instruction in the deformation instruction sequence on the image texture to determine the superimposed deformation image texture, the image processing method further comprises:

obtaining an initial key point set of the object in the image, the initial key point set being used as initial position information of the image texture before the first deformation offset or the second deformation offset is superimposed.

17. The computer program product of claim 16, wherein in case that the first deformation instruction is a head instruction in the deformation instruction sequence, superimposing the first deformation offset on the image texture based on the first deformation instruction in the deformation instruction sequence to determine the first deformation image texture comprises:

in response to the first deformation instruction, moving a position of at least one key point in the initial key point set to generate an adjusted key point set, the first deformation instruction being applied on the at least one key point to cause the at least one key point to be offset;

generating a mesh based on the adjusted key point set, vertex information of the mesh comprising initial position information of each key point in the initial key point set and adjusted position information of each key point in the adjusted key point set;

obtaining a difference value between the adjusted position information and the initial position information as a first deformation offset of each key point; and superimposing the first deformation offset on the image texture to determine the first deformation image texture.

* * * * *